US007240641B2

(12) United States Patent
Balan et al.

(10) Patent No.: US 7,240,641 B2
(45) Date of Patent: *Jul. 10, 2007

(54) HYDROGEN GENERATING APPARATUS AND COMPONENTS THEREFOR

(75) Inventors: Gabi Balan, Dunmore (CA); Johnston Donald, Calgary (CA); Daniela Balan, Dunmore (CA); Eugeniu Aldea, Calgary (CA); Mario Philip De Souza, Dunmore (CA)

(73) Assignee: Hy-Drive Technologies Ltd., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/402,903

(22) Filed: Apr. 13, 2006
(Under 37 CFR 1.47)

(65) Prior Publication Data

US 2006/0219190 A1 Oct. 5, 2006

Related U.S. Application Data

(62) Division of application No. 10/979,195, filed on Nov. 3, 2004, now abandoned, which is a division of application No. 10/051,284, filed on Jan. 22, 2002, now Pat. No. 6,817,320.

(60) Provisional application No. 60/262,395, filed on Jan. 19, 2001.

(51) Int. Cl.
*F02B 43/08* (2006.01)

(52) U.S. Cl. .................................. 123/3; 123/DIG. 12

(58) Field of Classification Search .................... 123/3, 123/DIG. 12
See application file for complete search history.

(56) References Cited

U.S. PATENT DOCUMENTS

| 3,157,172 A | 11/1964 | Mittelstaedt |
| 3,311,097 A | 3/1967 | Mittelstaedt |
| 3,597,275 A | 8/1971 | Winsel et al. |
| 3,653,364 A | 4/1972 | Bogan |
| 3,792,690 A | 2/1974 | Cooper |
| RE28,547 E | 9/1975 | Pacheco |
| 3,906,913 A | 9/1975 | Rupe |
| 3,939,806 A | 2/1976 | Bradley |
| 3,980,053 A | 9/1976 | Horvath |
| 4,023,545 A | 5/1977 | Mosher et al. |

(Continued)

FOREIGN PATENT DOCUMENTS

CA 2062739 12/1990

(Continued)

*Primary Examiner*—Marguerite McMahon
(74) *Attorney, Agent, or Firm*—Bennett Jones LLP

(57) ABSTRACT

A hydrogen generating system is provided for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. Various devices and systems are added to facilitate use and overcome previous problems with prior hydrogen generating systems.

3 Claims, 5 Drawing Sheets

U.S. PATENT DOCUMENTS

| | | |
|---|---|---|
| 4,031,865 A | 6/1977 | Dufour |
| 4,099,489 A | 7/1978 | Bradley |
| 4,111,160 A | 9/1978 | Talenti |
| 4,131,086 A | 12/1978 | Noguchi et al. |
| 4,141,326 A | 2/1979 | Wolber |
| 4,147,136 A | 4/1979 | Noguchi et al. |
| 4,200,062 A | 4/1980 | Duckworth |
| 4,271,793 A | 6/1981 | Valdespino |
| 4,332,219 A | 6/1982 | Gonzalez |
| 4,344,831 A | 8/1982 | Weber |
| 4,361,474 A | 11/1982 | Shoaf et al. |
| 4,368,696 A | 1/1983 | Reinhardt |
| 4,369,737 A | 1/1983 | Sanders et al. |
| 4,382,849 A | 5/1983 | Spicer |
| 4,442,801 A | 4/1984 | Glynn et al. |
| 4,541,397 A | 9/1985 | Young |
| 4,574,752 A | 3/1986 | Reichert, Jr. et al. |
| 4,594,990 A | 6/1986 | Batchelor |
| 4,596,211 A | 6/1986 | Szloboda |
| 4,720,331 A | 1/1988 | Billings |
| 4,750,453 A | 6/1988 | Valdespino |
| 4,763,610 A | 8/1988 | Thomas |
| 4,773,981 A | 9/1988 | Bidwell |
| 5,087,344 A | 2/1992 | Wenske et al. |
| 5,105,773 A | 4/1992 | Cunningham et al. |
| 5,119,768 A | 6/1992 | Russell |
| 5,140,513 A | 8/1992 | Yokoyama |
| 5,143,025 A | 9/1992 | Munday |
| 5,178,118 A | 1/1993 | Nakamats |
| 5,224,457 A | 7/1993 | Arsenault et al. |
| 5,231,954 A | 8/1993 | Stowe |
| 5,293,857 A | 3/1994 | Meyer |
| 5,305,714 A | 4/1994 | Sekiguchi et al. |
| 5,305,715 A | 4/1994 | Nissley |
| 5,357,908 A | 10/1994 | Sung et al. |
| 5,359,968 A | 11/1994 | Shiraishi et al. |
| 5,360,461 A | 11/1994 | Meinzer |
| 5,370,097 A | 12/1994 | Davis |
| 5,450,822 A | 9/1995 | Cunningham |
| 5,452,688 A | 9/1995 | Rose |
| 5,458,095 A | 10/1995 | Post et al. |
| 5,513,600 A | 5/1996 | Teves |
| 5,526,786 A | 6/1996 | Beck et al. |
| 5,691,692 A | 11/1997 | Herbstritt |
| 5,711,865 A | 1/1998 | Caesar |
| 5,787,864 A | 8/1998 | Collier, Jr. et al. |
| 5,799,624 A | 9/1998 | Hsieh |
| 5,813,222 A | 9/1998 | Appleby |
| 5,843,292 A | 12/1998 | Spiros |
| 5,845,485 A | 12/1998 | Murphy et al. |
| 5,997,283 A | 12/1999 | Spiros |
| 6,209,493 B1 | 4/2001 | Ross |
| 6,332,434 B1 | 12/2001 | De Souza et al. |
| 6,336,430 B2 | 1/2002 | de Souza et al. |
| 6,524,453 B1 | 2/2003 | De Souza et al. |
| 6,817,320 B2 * | 11/2004 | Balan et al. .................. 123/3 |
| 2002/0179454 A1 | 12/2002 | Ross |

FOREIGN PATENT DOCUMENTS

| WO | WO 00/53918 | 9/2000 |
|---|---|---|

* cited by examiner

HYDROGEN GENERATING APPARATUS AND COMPONENTS THEREFOR

CROSS REFERENCE TO RELATED APPLICATIONS

This is a divisional application of U.S. application Ser. No. 10/979,195, filed Nov. 3, 2004, now abandoned presently pending, which is a divisional application of U.S. application Ser. No. 10/051,284, filed Jan. 22, 2002 now U.S. Pat. No. 6,817,320, issued Nov. 16, 2004. U.S. application Ser. No. 10/051,284 is a non-provisional of U.S. provisional application 60/262,395, filed Jan. 19, 2001 to which the present application also claims priority.

FIELD OF THE INVENTION

The present invention is directed to a hydrogen generating apparatus and in particular a hydrogen generating apparatus for use in motor vehicles to increase the performance of the engine of the motor vehicle.

BACKGROUND OF THE INVENTION

The use of hydrogen as a supplemental fuel in motor vehicle engines has been proposed to increase the performance of the engine. Hydrogen and oxygen, when used as part of the air/fuel mixture for the operation of the engine, have been found to increase the performance of the engine by increasing the mileage and by reducing the amount of emissions from the engine. The hydrogen and oxygen may be generated through electrolysis of an aqueous solution with the gases given off being mixed with the fuel and air supplied to the engine.

The generation of small quantities of hydrogen and oxygen using one or more electrolysis cells with the hydrogen and oxygen generated then being combined with the usual air/fuel mixture to improve the efficiency of internal combustion engines has been proposed in a number of prior patents. Some systems of these prior patents utilized the alternator or an auxiliary generator attached to the engine to provide the electrical power for the system.

One example of such a system is shown in U.S. Pat. No. 4,271,793. This patent describes an internal combustion engine having a fuel system for feeding an air/fuel mixture to the combustion chamber and an electrical generation system, such as an alternator. An electrolysis cell was attached adjacent to the engine to generate hydrogen and oxygen upon the application of a voltage between the cathode and the anode of the electrolysis cell. A gas delivery connects the cell to the engine fuel system for feeding the hydrogen and oxygen to the engine combustion chambers. The electrolysis cell was placed under a predetermined pressure to prevent the electrolyte from boiling off. The cell also included a cooling system and other safety features.

Another electrolysis cell is disclosed in U.S. Pat. No. 5,231,954. The electrolysis cell of this patent was used for generating hydrogen and oxygen gases which were added to the fuel delivery system as a supplement to the gasoline or other hydrocarbons burned therein. The cell was designed to reduce the hazard of explosion by withdrawing the gases through a connection with the vacuum line of the positive crankcase ventilation (PCV) system of the engine and by utilizing a slip-fitted top cap for the electrolysis cell.

A further example of an electrolysis cell for use in connection with an internal combustion engine, for generating hydrogen and oxygen gases is shown in U.S. Pat. No. 5,458,095. This system utilized an electric pump to draw the hydrogen and oxygen gases out of the cell, where the outlet side of the pump was connected to the air intake manifold using a hose having a terminating insert. The insert was formed from copper tubing bent at an appropriate angle to insure that the hydrogen and oxygen gas outlet from the pump was in the same direction as the downstream airflow in the air intake manifold.

Although much work has been conducted to advance automotive electrolysis systems, these systems have not been generally accepted due to safety and convenience concerns. A hydrogen generating system is required which overcomes at least some of the safety and convenience problems of previous systems.

SUMMARY OF THE INVENTION

The present invention is directed to a hydrogen generating system for use in internal combustion engines for increasing the efficiency of the engine and decreasing emissions from the engine. The hydrogen generating system of the present invention comprises an electrolysis cell for generating hydrogen and oxygen gases by electrolysis of an aqueous solution, a power source for providing electrical power to the electrolysis cell and an outlet flow means for introducing the generated gases into the intake manifold system of an internal combustion engine.

In accordance with one aspect of the present invention there is provided a hydrogen generating system for use in an internal combustion engine for increasing the efficiency of the engine and decreasing emissions from the engine, the hydrogen generating system comprising: an electrolysis cell for generating hydrogen and oxygen gases by electrolysis of an aqueous solution, a power source for providing electrical power to the electrolysis cell; an outlet flow means for introducing the generated gases into the intake manifold system of an internal combustion engine; a monitoring means for monitoring the operating conditions of the hydrogen generating system, the monitoring means including an electrolyte level monitoring device in the electrolysis cell including a tube, a circuit disposed in the tube, the circuit including a switch positioned adjacent a selected level of the aqueous solution and a float selected to float on the aqueous solution, the float being slidably engaged on the tube, and free to ride along the tube as driven by changes in the surface level of the aqueous solution and the float including means for actuating the switch as it rides along the tube; and a control means in communication with the monitoring means and adapted to control the operation of the hydrogen generating system in response to the monitoring means, the control means including means in communication with the electrolyte level monitoring device and adapted to indicate when the level of the aqueous solution reaches the selected level as indicated by the float actuating the switch.

In one embodiment the switch is a reed switch disposed within the tube. There can be any number of switches in the circuit, preferably there are one or two switches. A magnet can be disposed in the float to act as the means for actuating the switch. In one embodiment, the control means lights an indicator light close to the cell to indicate when the liquid level rises to an upper acceptable level. In a preferred embodiment, the circuit enters the cell though an opening in the cell which is positioned above the normal upper level of the fluid.

In accordance with another aspect of the present invention, there is provided a hydrogen generating system for use in an internal combustion engine for increasing the efficiency of the engine and decreasing emissions from the engine, the hydrogen generating system comprising: an electrolysis cell for generating hydrogen and oxygen gases by electrolysis of an aqueous solution contained within the cell, the electrolysis cell having an outer surface; a power source for providing electrical power to the electrolysis cell; an outlet flow means for introducing the generated gases into the intake manifold system of an internal combustion engine; a monitoring means for monitoring the operating conditions of the hydrogen generating system, the monitoring means including an electrolyte level monitoring device including a tank circuit having an inductor and a capacitor connected in parallel, the inductor being an electrical wire wrapped at least one turn about the electrolysis cell adjacent a selected level of the aqueous solution within the electrolysis cell, and interface circuitry for exciting the tank circuit such that a sine wave is generated and observing evidence of energy loss in the circuit; and a control means in communication with the monitoring means and adapted to control the operation of the hydrogen generating system in response to the monitoring means, the control means including means in communication with the electrolyte level monitoring device and adapted to indicate when the level of the aqueous solution reaches the selected level as indicated by the energy loss in the circuit.

Preferably, the circuit is disposed about the outer surface of the electrolysis cell so that no opening through the cell housing need be made. This avoids creating an opening susceptible to leakage. In one embodiment, there is an upper tank circuit and a lower tank circuit, indicating an upper electrolyte level and a lower electrolyte level respectively. The control means can be adapted to indicate level of electrolyte solution reaches the selected level by shutting down operation of the system, by sounding an alarm, by sending a message to a user display or by illumination of a light.

In accordance with another aspect of the present invention, there is provided a hydrogen generating system for use in an internal combustion engine of a vehicle for increasing the efficiency of the engine and decreasing emissions from the engine, the hydrogen generating system comprising: an electrolysis cell for generating hydrogen and oxygen gases by electrolysis of an aqueous solution; a power source for providing electrical power to the electrolysis cell as supplied by a battery power supply; an outlet flow means for introducing the generated gases into the intake manifold system of the internal combustion engine; a monitoring means for monitoring the operating conditions of the hydrogen generating system, the monitoring means including a sensor for monitoring battery voltage; and a control means in communication with the monitoring means and adapted to control the operation of the hydrogen generating system in response to the monitoring means, the control means including means for comparing the battery voltage to a voltage indicative of proper alternator operation and controlling operation of the hydrogen generating system when the battery voltage is not indicative of proper alternator operation.

In one embodiment, the control means is further adapted to indicate that the battery voltage is not indicative of proper alternator operation.

In accordance with another aspect of the present invention, there is provided a hydrogen generating system for use in an internal combustion engine of a vehicle for increasing the efficiency of the engine and decreasing emissions from the engine, the hydrogen generating system comprising: at least one electrolysis cell for generating hydrogen and oxygen gases by electrolysis of an aqueous solution; a power source for providing electrical power to the electrolysis cell; an outlet flow means for introducing the generated gases into the intake manifold system of an internal combustion engine, the outlet flow means including a vacuum pump for drawing the generated gases under vacuum toward the internal combustion engine, the vacuum pump having an inlet tubing and an outlet tubing and a vacuum control arrangement for conveying supplemental gas from gas source and introducing the substantial gases to the generated gases in the inlet tubing to reduce the vacuum generated by the vacuum pump; a monitoring means for monitoring the operating conditions of the hydrogen generating system; and a control means in communication with the monitoring means and adapted to control the operation of the hydrogen generating system in response to the monitoring means.

The gas source can be atmospheric air, gases from the exhaust gas manifold of the vehicle or gases from the air intake of the vehicle, preferably downstream of the mass air flow sensor. In one embodiment, the supplemental gas is heated over the temperature of ambient air. Alternately or in addition, the supplemental air can be filtered and/or dried.

In one embodiment, the vacuum control arrangement includes a valve for controlling the flow of supplemental gas into the inlet tubing. The supplemental air is preferably introduced to the inlet tubing between a flame arrestor and the vacuum pump.

In another aspect of the present invention, there is provided a hydrogen generating system for use in an internal combustion engine of a vehicle for increasing the efficiency of the engine and decreasing emissions from the engine, the hydrogen generating system comprising: a plurality of modules, each module containing an electrolysis cell for generating hydrogen and oxygen gases by electrolysis of an aqueous solution; a power regulator for providing regulated electrical power to the electrolysis cell, the power regulator generating an AC component; an outlet flow means for introducing the generated gases from the cells into the intake manifold system of the internal combustion engine; a monitoring means for monitoring the operating conditions of the hydrogen generating system; a control means in communication with the monitoring means and adapted to control the operation of the hydrogen generating system in response to the monitoring means; and wherein the AC component of the power regulators are phase locked with a selected module acting as the master module and a selected others of the modules acting as slave modules.

In one embodiment, each module contains phase locking circuitry, the phase locking circuitry of the master module generating a chopping frequency and inputting the chopping frequency to the slave modules. The system can further comprise a controller selected to prevent the operation of any slave modules not phase locked with the master module. The controller can be a subroutine in the control means.

In another aspect of the present invention there is provided a hydrogen generating system for use in an internal combustion engine of a vehicle for increasing the efficiency of the engine and decreasing emissions from the engine, the hydrogen generating system comprising: an plurality of electrolysis cells for generating hydrogen and oxygen gases by electrolysis of an aqueous solution, the electrolysis cells being electrically connected in series; a power source for providing electrical power to the electrolysis cells through an output circuit; an outlet flow means for introducing the generated gases into the intake manifold system of the internal combustion engine; a monitoring means for monitoring the operating conditions of the hydrogen generating system, the monitoring means including sensor for monitoring the integrity of the output circuit from the power source; and a control means in communication with the monitoring means and adapted to control the operation of the hydrogen generating system in response to the monitoring means, the control means including means in communication with the sensor for controlling operation of the hydrogen generating system based on the integrity of the output circuit.

In one embodiment, the sensor monitors the voltage in the electrical connection between the penultimate and last cells. In another embodiment, the sensor monitors current in the output circuit.

BRIEF DESCRIPTION OF THE DRAWINGS

Preferred embodiments of the present invention are illustrated in the attached drawings in which.

DETAILED DESCRIPTION OF THE PREFERRED EMBODIMENT

Figure 1:
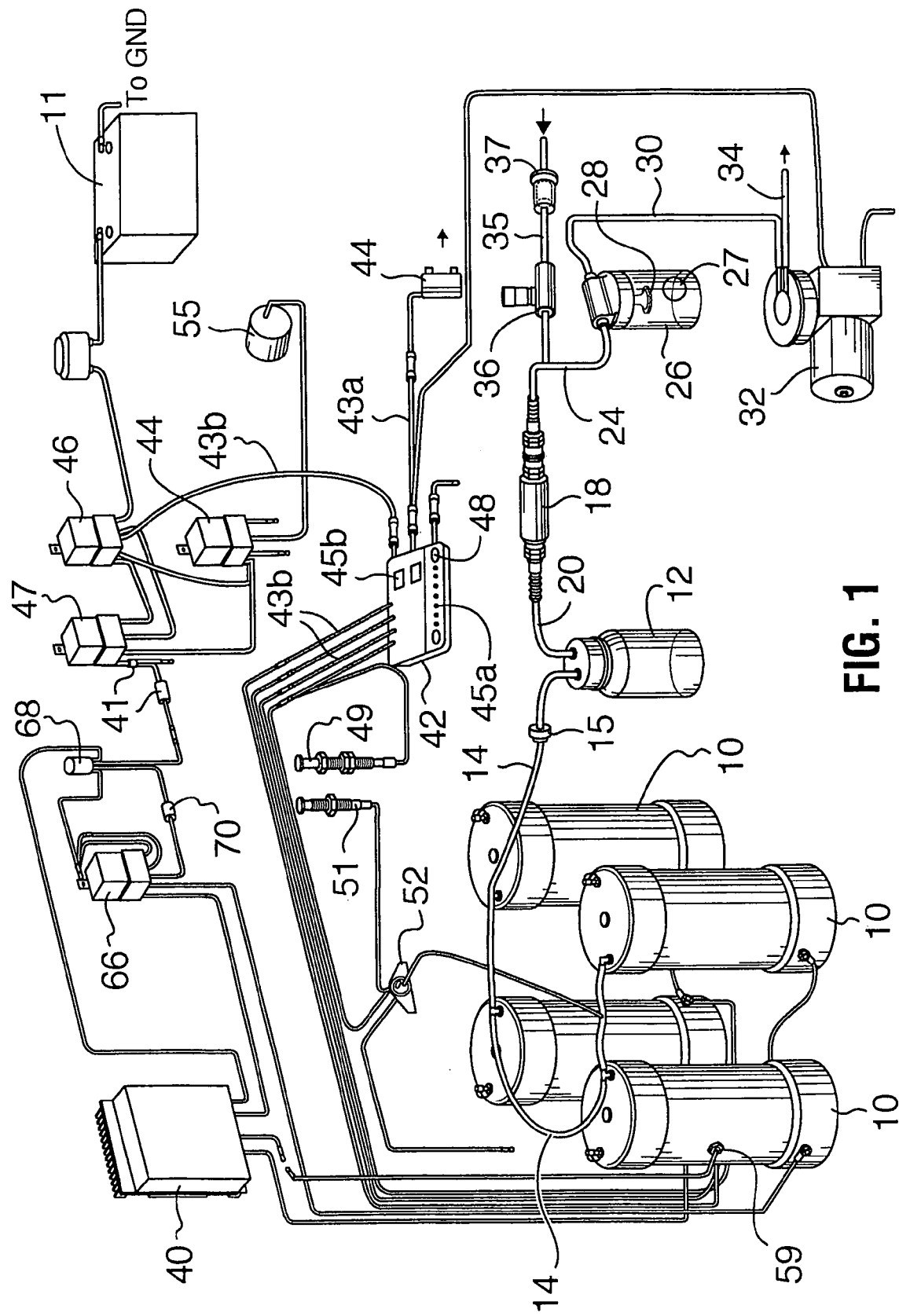
FIG. 1 is a perspective view of a preferred embodiment of the hydrogen generating system of the present invention.

A preferred embodiment of a hydrogen generating system of the present invention is illustrated in FIG. 1. The hydrogen generating system includes one or more electrolysis cells 10 which are used to generate hydrogen and oxygen gases by electrolysis of a suitable aqueous medium. In the embodiment illustrated in FIG. 1, four electrolysis cells 10 are utilized, however other numbers of cells are possible. The number of cells 10 utilized in the system depends upon the capacity of the cell for generating hydrogen and the requirements of the engine to which the system is attached. Thus for passenger cars and light duty trucks utilizing gasoline engines, about four cells with a total capacity of about 500-750 cm$^3$ of hydrogen per minute could be utilized. For heavy duty trucks and other heavy equipment, especially those utilizing diesel engines, four, six or eight cells having a total capacity of about 1000-1500 cm$^3$ of hydrogen per minute are preferred.

The gases generated by the electrolysis cells 10, as energized by a power source such as battery 11, are fed through a moisture collector 12 which is connected to cells 10 by a suitable tubing 14. Tubing 14 is provided with a check valve 15 that prevents back flow of fluids. The output of the moisture collector 12 is connected to a flame arrestor 18 by means of a suitable tubing 20. Flame arrestor 18 acts to take the energy out of a flame which could migrate up from the engine. From flame arrestor 18 the gases flow through tubing 24 to an automatic safety shut-off collector 26 which has a ball float valve 27 and a valve seat 28. Collector 26 is selected to shut off the flow of gas, and thereby, the entire system, as will be described hereinafter, if excess amounts of liquid are passed from the electrolysis cell. The flow of gas through the collector 26 will be stopped if the liquid level in the shut-off collector 26 rises such that ball 27 seats in valve seat 28.

The output of the shut-off collector 26 is connected through tubing 30 to a low flow vacuum pump 32 which pumps the gases through tubing 34 to a suitable part of the intake system of the engine. Preferably the flow of gases is regulated. This can be done by adjusting power to the pump or by adjusting the flow by permitting the pump to draw additional fluid to supplement the draw of gas from the electrolysis cells, as will be described hereinafter. The gases may be injected by the pump 32 into the intake system of the engine before the carburetor or injector by connecting the tubing 34 between the outlet of the pump 32 and the air breather box of the intake system of the engine upstream from the air filter. Alternatively, the gases may be injected directly to the carburetor or other fuel delivery system of the engine or may be injected to the intake manifold after the carburetor or fuel delivery system if a proper filtering system is provided.

Pump 32 renders electrolysis cells 10 and the gas delivery system upstream of the pump under vacuum. The vacuum can sometimes be undesirably high, reaching 20 inches of mercury. This causes excessive evaporation of electrolyte and condensation in the gas delivery lines and components and can lead to the formation of ice plugs in the delivery system. To avoid this problem, the vacuum in the line should be maintained at less than 5 inches of mercury and preferably about 2 to 3 inches of mercury. Since it is difficult to achieve this low level vacuum with most commercially available pumps and pumps that can withstand the rigors of automotive applications, a vacuum control system is provided around pump 32, the vacuum control system draws fluid from a source other than the gases generated in the electrolysis cells to supplement gas draw to the pump. The vacuum control permits the vacuum to be maintained at desirable levels by introducing supplemental fluid into the system. The vacuum control system includes a fluid supply tube 35 that conveys a flow of gas from a gas source other than the electrolysis cells to mix with the gases being drawn from the electrolysis cells 10 by the pump. While the gas source can be, for example, the gas in tubing 34 or atmospheric air, preferably the gas source is filtered, heated and/or dried such as gases from the exhaust gas manifold, exhaust gas recirculation systems of the vehicle in which the hydrogen generating system is installed or air from the air intake which has already been metered by the mass air flow sensor. Using air from the air intake permits the monitoring of total air mixing with fuel.

Tube 35 opens into the gas delivery system between flame arrestor 18 and pump 32. A particulate filter 37 is preferably used in the tubing. For safety, tube 35 should not be connected upstream of the flame arrestor, as will be appreciated. To control the flow of air through tube and into the gas delivery system, a needle valve 36 is mounted in tube 35. Needle valve 36 provides precise control over the flow through tube 35 and, thereby, control over and reduction of the vacuum in the gas delivery system. Introduction of supplemental gases can reduce relative humidity in the gas delivery system and reduces electrolyte evaporation by reducing vacuum in the cells. The use of a heated, dried gas source also avoids the formation of ice in the gas delivery system.

Needle valve 36 can be controlled manually or automatically by a control system working with a vacuum sensor. The needle valve can be replaced by other flow control means. For example, in another embodiment, needle valve 36 is replaced by a check valve. The check valve is selected to open, allowing a controlled amount of supplemental gas to flow into the electrolysis gas delivery system, when the gases in the delivery system reach a preselected upper limit of vacuum such as 5 inches of mercury.

The hydrogen generating system includes a power regulator 40 for conditioning power to the electrolysis cells. Preferably power regulator 40 is a controllable, logic-ready device, having as its main component a DC-DC power converter working in current limit with a logic interface capable of output proportional to a binary input. Since the amount of power supplied to the electrolysis cells controls the electrolysis reaction, power regulator 40 is preferably capable of varying the current output to a profile supplied by a controller, which will result in optimum hydrogen and oxygen quantities being produced and then delivered to the engine. This allows the output of the system to be adjusted to optimum profiles, according to the demand.

The electrical lines of the hydrogen generating system can sometimes generate electromagnetic interference (EMI). The EMI can interfere with audio signals such as those in the FM and CB range. To reduce interference, the magnetic field can be reflected back to the emitting components by use of a ferrite bead and capacitor combination 41 or RF shielded coatings around the wires.

A bus arrangement can be used in the electrical system, as this provides flexibility.

A dash module 42 is provided to allow the user to interact with the hydrogen generating system. Dash module 42 is mounted on the motor vehicle in a location easily accessible by the operator of the motor vehicle. The dash module allows the operator of the motor vehicle to control and monitor the hydrogen generating system as required or desired. The dash module 42 is connected via an electrical line 43a to the ignition of the motor vehicle with a suitably sized fuse 44 such as a 5 amp fuse and through lines 43b to other components of the hydrogen generating system.

The hydrogen generating system preferably also provides for visual feedback to the operator of the motor vehicle. The dash module 42 can be provided with one or more LED displays 45a, for example one LED display indicating when the power is turned on to the system, and a second LED display to indicate trouble with the system. Preferably, the system is provided with a display module that includes an alphanumeric display 45b, which can display system messages provided by a controller such as, for example, "System OK", etc.

The hydrogen generating system of the present invention includes suitable control and monitoring means for safe and effective operation. In a preferred embodiment, the control means maximizes system efficiency under various conditions of operation of the engine.

Figure 8:
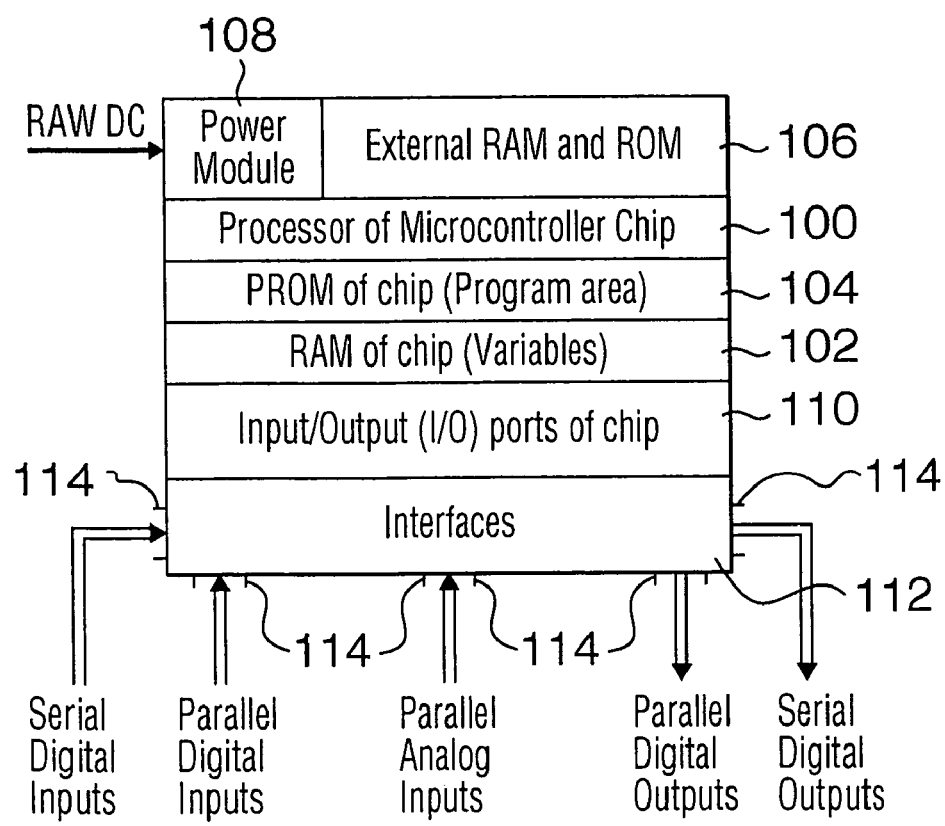
FIG. 8 is a diagram of an intelligent controller useful in the present invention.

This control can be provided in various ways such as by decentralized or centralized controllers using discrete or intelligent logic. Of course the use of centralized, intelligent control, such as that described hereinafter in reference to FIG. 8, is preferred as it is less expensive, more easily adapted to changes in the system, etc. In one embodiment, the monitoring means are in communication with a main microprocessor controller that uses intelligence, established in software, for control of the hydrogen generating system. The central controller could be located anywhere in the vehicle such as, for example, with the power regulator or in the dash module. Other specialized microcontrollers could be added to communicate with the main microprocessor, if desired.

In the embodiment illustrated in FIG. 1, control is decentralized and includes discrete components. While some control is at the sensor level, dash module 42 houses most of the control logic. Various monitoring means and switches, as will be described hereinbelow, communicate with the dash module control logic for system operation.

A first relay or solenoid 46 is operated by dash module 42 to cut power to the power regulator 40 in response to a signal from one or more of the various monitoring means or switches. Another relay 47 is controlled in the same way as relay 46 to work in redundancy therewith. In a preferred embodiment the relays 46 and/or 47 are incorporated into power regulator 40.

When relays 46 and/or 47 shut down the operation of the electrolysis cells, it is preferred that the residual energy stored in the cells 10 be removed. This is preferably accomplished by a relay 66 with a capacitor 68 and resistor 70. When power is cut to the electrolysis cells, relay 66 is activated and connects the cells to ground to bleed off any residual energy stored in the cells.

The controller in dash module 42 also communicates with pump 32 and can shut down its operation in response to signals from the various monitoring means and switches.

For safety and for system protection, one or more safety shutoff switches and safety monitoring features are provided for manual or automatic shutdown and/or adjustment of electrolysis in the system. Not all of the switches/sensors need be in any one system and, as will be appreciated, some of the monitoring means and switches are best suited to control by an intelligent controller rather than by discrete control.

One switch is indicated in FIG. 1 as switch 48 on dash module 42. This switch is actuated by the user to shut power to the system.

The hood of the compartment in which electrolysis cells 10 is positioned is provided with a shutoff switch 49 mounted such that opening the hood of the engine compartment will cause the switch to open and shutdown the hydrogen generating system. The compartment can be for example, the engine compartment, trunk compartment or another compartment on the vehicle body. More than one hood-actuated switch can be used, if desired.

In addition, preferably cells 10 are installed in their own gas generator box 50 (FIG. 4) and a safety switch 51 is positioned on the door of the box. Opening the door actuates switch 51, through the control logic of dash module 42, to shut down the hydrogen generating system.

A pressure switch 52 senses the vacuum in line 14. If the vacuum is lost or changes significantly, the sensor communicates a signal to the control logic to shut down the system. Vacuum changes may occur, for example, where there is an ice plug in the delivery line or where the valve in collector 26 is closed.

In a preferred system using an intelligent controller, operation of vacuum pump 32 can also be monitored, particularly with respect to the electrical power being provided to the pump 32. Should the electric circuit to the pump 32 be interrupted, the controller will cause the system to shut down by cutting the electrical power supplied to electrolysis cells 10. In addition, should the gas supply line of the gases generated by the electrolysis cell 10 become blocked (i.e. by an ice plug, ball 27 seating in valve 28, etc.) such that the pressure in the line changes significantly, the controller will sense that through the current draw of the pump circuit. In particular, if the controller senses that the current draw of the pump is not within an acceptable range, the controller displays a pump failure message at dash module 42 and cuts the power supplied to the electrolysis cells 10.

In one embodiment, pressure switch 52 can be selected to act as a sensor and can operate in a control loop with pump 32. In such an embodiment, the controller monitors the reading of pressure switch 52 and regulates power supplied to the pump to maintain the pressure the gas delivery line within a selected range.

The hydrogen generating system of the present invention also includes a means of determining that the engine is running so that if power is applied to power regulator 40 but the engine is not actually running or the alternator is not properly operating, no electrolysis will take place. This is important to prevent the battery from being run down and to prevent a build up of hydrogen gas. The means to determine that the engine is running could be a sensor monitoring one or more of the engine conditions indicative of engine operation. For example, sensors could be used to monitor one or more of engine vacuum, engine oil pressure, alternator or battery voltage, or signals from the vehicles on-board engine computer. While only one sensor is needed, it may be useful for ease of installation to include inputs for more than one sensor to accommodate more than one type of installation. With the exception of the collection of signals of the vehicle computer, all of these sensors can communicate with a discrete or an intelligent controller.

In the illustrated embodiment, for internal combustion engines, engine operation is determined by a relay 54 that senses alternator 55 voltage. Relay 54 is adjusted such that should the alternator voltage drop to a level indicative of alternator inoperation, relay 54 will interact with relays 46 and 47 to cut power to power regulator 40, thereby shutting down the hydrogen generating system.

In some engines it is difficult to access alternators or to install vacuum or oil pressure switches. However, in most vehicles the battery is accessible. Normally, in a vehicle having an internal combustion engine, when the engine and/or alternator are not functioning, the battery voltage is less than 13V. However, when the engine is operating and the alternator is operating properly, the battery voltage is generally between 13.5 to 13.8V. Thus, a useful circuit for controlling the function of the hydrogen generating system based on engine operation, monitors battery voltage and compares it to a voltage indicative of proper engine/alternator operation. This circuit is advantageously controlled by an intelligent controller.

Figure 2:
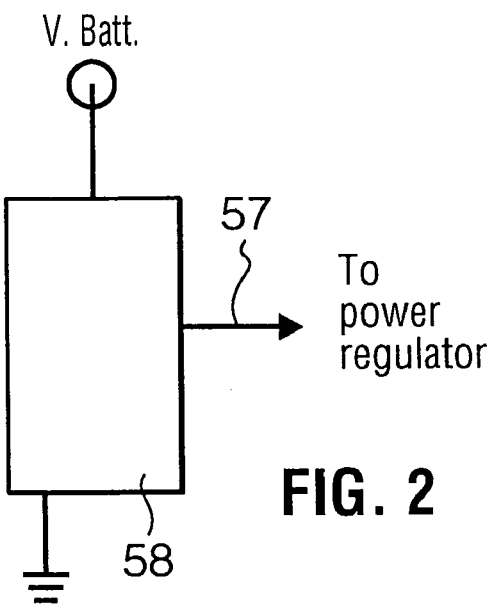
FIG. 2 is a diagram of a circuit useful for determining battery voltage.

With reference to FIG. 2, one battery voltage monitoring circuit is disclosed. In the circuit, a controller 58 senses battery voltage and compares it to a reference indicative of normal engine operation wherein the alternator is working. If it is determined that the battery voltage is below that indicative of normal engine operation, controller 58 can signal the hydrogen generating system power regulator, as indicated by arrow 57, to cut the power applied to the cells. In addition to shutting the hydrogen generating system down, controller 58 can create a signal which notifies the vehicle user that a power supply problem exists. Using an intelligent controller controller 58 can be checked periodically for battery voltage such that the system can be restarted if the battery voltage recovers.

Figure 4:
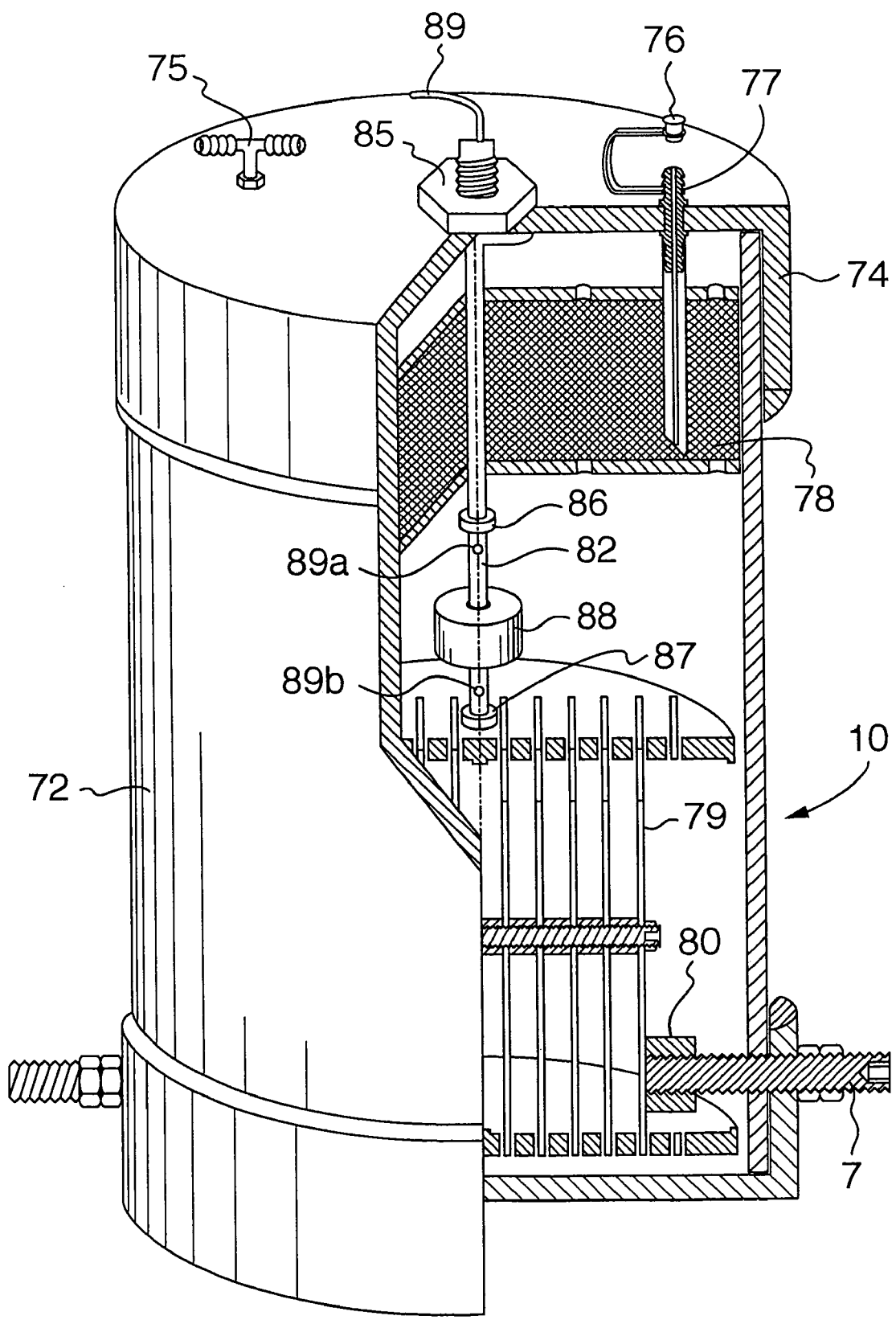
FIG. 4 is a perspective, partially cut away view of an electrolysis cell useful in the present invention with an electrolyte level monitoring apparatus shown, in part, schematically.
Figure 5:
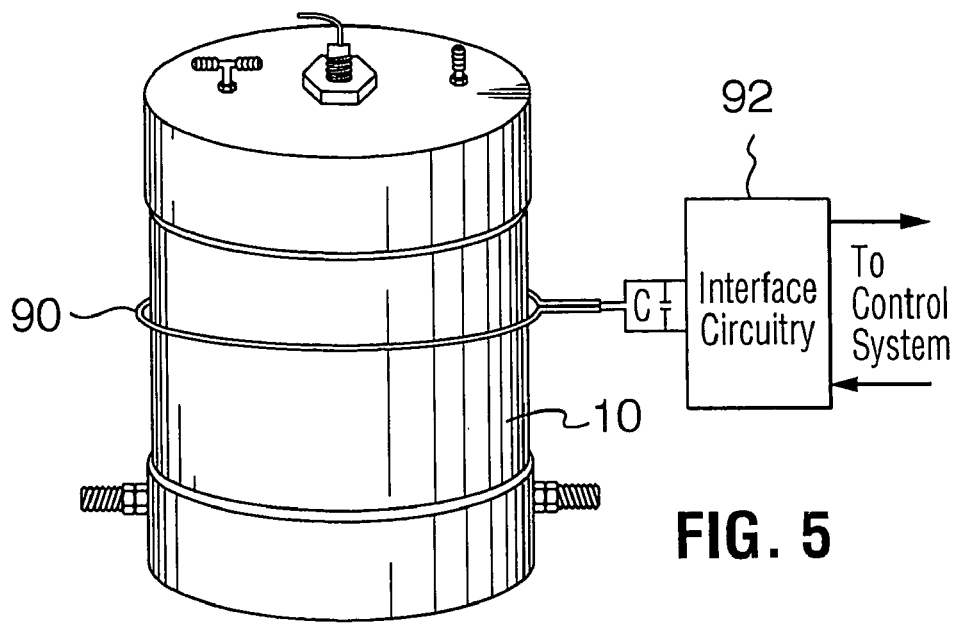
FIG. 5 is a schematic view of an electrolyte level monitoring apparatus according to one aspect of the present invention.

One parameter that is preferably monitored and used to control operation of the hydrogen generating system is the level of electrolyte solution in the electrolysis cells 10. In the illustrated embodiment, the electrolysis cells 10 are preferably provided with a level sensor 59, which provides feedback to the control logic of dash module 42 on the level of electrolyte solution in the electrolysis cell 10. If the level of the electrolyte solution in the electrolysis cell 10 drops to a level which would cause excessive exposure of the electrodes, the cell could be damaged or production of gases could become inefficient. In this situation, dash module 42 will shutdown operation of the hydrogen generating system. Some embodiments of electrolyte level monitoring devices are shown in FIGS. 4 and 5, described hereinafter. If the level of the electrolyte is below a specified limit, then the controller could shut down the system. Alternately, a warning could be displayed to advise the operator to add fluid, preferably steam distilled water, to the cell 10. If the fluid is not added and the level is not brought up above the limit within a set period of time, the controller would shut the system down and indicate the system failure.

To provide an indication of time, an hour meter can be connected into the system. The hour meter can be connected anywhere to monitor the operating time of the cells, but is usually mounted close to the controller. In a preferred embodiment, a micro-controller real time clock is used. The real time clock generates total engine operation time for the vehicle and total operation time for the hydrogen generating system. By software, these sums are stored in non-volatile memory. Thus, hour meters that increase the cost and the size of the controller, for example the dash module, can be eliminated.

Figure 3A:
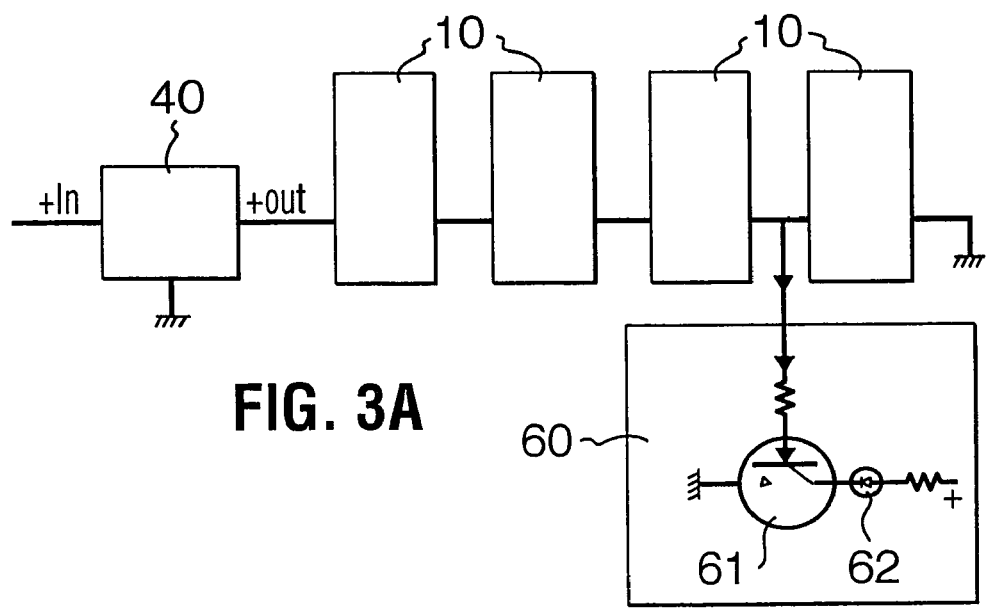
FIGS. 3A and 3B are diagrams showing cell circuit monitoring arrangements useful in the present invention.
Figure 3B:
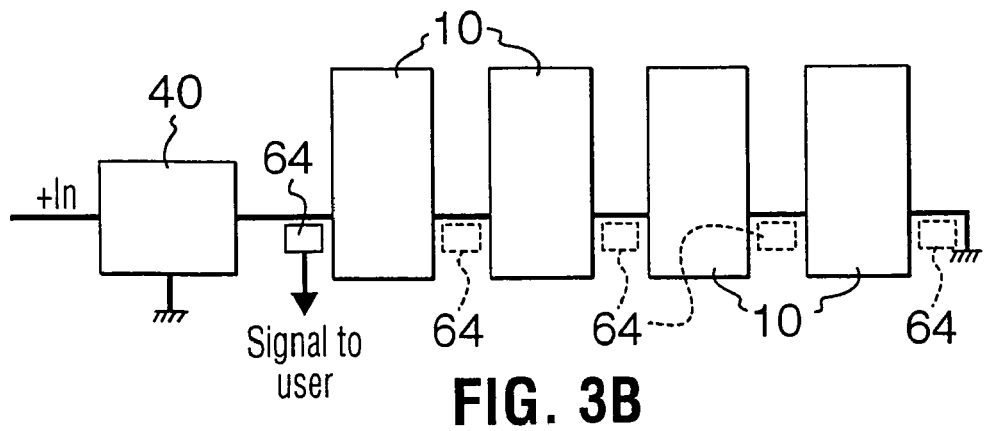

Proper generation of gases also relies on the cell circuit condition. In one embodiment, the system includes an arrangement for monitoring the integrity of the output circuit from the regulator. The arrangement can sense a cell circuit current or voltage. Referring to FIGS. 3A and 3B, power regulator 40 provides power to electrolysis cells 10, which are connected in series. A break in the circuit such as by boiling dry, connections loosing contact, etc. can be detected by monitoring voltage (FIG. 3A) or current (FIG. 3B) in the circuit. The useful values or ranges for current or voltage in the system can be determined based on system design.

Referring particularly to FIG. 3A, a voltage sensor 60 can monitor voltage between the last two cells of the circuit. To monitor the voltage, one useful arrangement includes a transistor or comparator 61 that operates as a switch. When voltage is sensed in the circuit, an LED 62 on, for example, the dash module is illuminated. When no voltage is sensed, transistor 61 switches the circuit so that LED 62 does not illuminate. Of course, various modifications can be made to this circuit with a similar result. For example, LED 62 can be replaced with an automatic control that can shut down system operation or the transistor can be replaced with an intelligent system.

Of course, the voltage sensing arrangement of FIG. 3A will not sense an open circuit in the last cell of the series or in the connection to ground. Thus, alternatively, a current sensing arrangement can be used to determine if the cells are being powered. A current sensing device 64, such as a Hall effect sensor, is positioned anywhere along the circuit, as indicated in phantom. A sensed current outside of a desirable range or a no-current condition signal because of a break anywhere along the circuit is passed to the controller for communication to the user, for example, through the dash module. This can be done easily via software.

Monitoring the temperature of power regulator 40 is sometimes also useful. In particular, if the power regulator heats up beyond acceptable temperatures, the feed back components such as shunts therein can give false readings or, in extreme situations, contacts in the power regulator can be damaged and destroyed, such that the power regulator burns out. Thus, another sensor useful in the present invention is a temperature transducer on the circuit board of the power regulator. The controller can monitor the power regulator temperature, as indicated by the temperature transducer, and control output to the power regulator to maintain the temperature within an acceptable range. Alternatively or in addition, the controller can use temperature information to correct signals from the feed back components.

Many electrolysis cell types are useful in the present invention. Referring to FIG. 4, in one embodiment the electrolysis cell 10 utilized in the hydrogen generating system of the present invention is similar to the cell described in detail in U.S. application Ser. No. 09/719,976, also known as WO/00/00671 published Jan. 6, 2000 the disclosure of which is hereby incorporated by reference. Electrolysis cell 10 preferably has a cylindrical shaped case 72 constructed of a suitable material that is inert to the electrolyte solution and not affected by the voltages or temperatures encountered in the electrolysis cell 10. Case 72 should also preferably have a co-efficient of expansion that does not cause significant expansion of the dimensions of the cell 10 under the operating conditions of the hydrogen generating system. Preferably, case 72 of the electrolysis cell 10 is a polyvinyl chloride.

The electrolysis cell 10 is provided with a cap 74 that is welded to the sidewall once the components of the electrolysis cell have been assembled. The cap 74 is provided with an outlet 75 to which the tubing 14 is connected. Cell 10 also has a fill plug 76 which is removable to allow the addition of distilled water or electrolyte solution to the cell through a fill port 77. Preferably, the fill plug 76 also incorporates a pressure release mechanism to provide for relief of the pressure within the cell 10 should the interior pressure increase beyond a set limit.

A mesh layer 78 fills an upper area of the cell. Gases produced by the cell pass through mesh 78 to outlet 75 and, in so doing, are dewatered by the mesh. Fill port 77 extends down through the mesh layer so that, during filling, electrolyte does not saturate the mesh.

The electrolysis cell 10 is provided with an electrode assembly 79, which is described in detail in U.S. application Ser. No. 09/719,976. The electrodes that make up the electrode assembly are provided as a monocell, monopolar assembly of an anode and a cathode. The outside cathode and anode electrode plates are provided with adapters 80 for electrical connection to terminals 70.

The materials from which the electrode assembly is constructed are selected to minimize the effects of different coefficients of expansion of the materials, withstand strong corrosive action of the electrolyte solution and provide effective and efficient electrolysis process. Thus, preferably, the electrode plates are a suitable stainless steel material, most preferably nickel plated stainless steel.

The electrolyte solution utilized within the electrolysis cell 10 is preferably a basic aqueous solution to provide for increased efficiency of the electrolysis reaction. Preferably, the solution is also adjusted to remain in solution form and not freeze at extremely low temperatures, down to −40° or more. Most preferably, the electrolyte solution is a 20 to 30% KOH solution.

FIG. 4 illustrates one electrolyte level monitoring sensor useful in the present invention. The level monitoring sensor includes a rigid tube 82 installed through an opening in the upper cap 74. Tube 82 is held in position by a bolt 85 threaded down on a threaded portion of the tube. Tube 82 has mounted thereon an upper stop 86 and a lower stop 87. Slidably mounted therebetween is a float 88. Float 88 is selected to float on the electrolyte solution to be used in the cell and is free to ride up and down tube 82 between stops 86 and 87. Sufficient clearance must be provided between tube 82 and float 88 such that the float does not catch on the tube and does not get jammed even in the presence of granular debris which may accumulate in electrolyte solution, over time. Tube 82 houses a circuit, as indicated by conductor 89, connected to a low level indicator such as an LED on dash module 42. The circuit is switched depending on the position of float 88. In particular, one or two reed switches 89a, 89b (shown in phantom as they are positioned in tube 82) are positioned within tube 82. If one reed switch is used it is positioned within the tube adjacent the lower allowable liquid level and if a second reed switch is used it is positioned above the first switch adjacent the upper desirable liquid level. The reed switches are selected to be actuated by a magnet positioned within float 88. The exact positions of the reed switches within tube 82 should be determined with consideration as to the position of magnet within the float, the depth that floats sinks into the surface of the electrolyte (i.e. the density of the float material relative to the electrolyte) and the desired upper and lower levels of the electrolyte within the cell. When the lower reed switch is activated, it indicates that the cell must be filled. When the cell is being filled, the float will be moved up the tube by the rising liquid level until it is close enough to the reed switch 89a to actuate the switch to indicate that the upper level has been reached and, thereby, to warn the user to stop filling, for example, by illumination of an LED near the cell. This level sensor is improved over many previous sensors since it provides a positive indication of low and high levels. In addition, since it is installed though an opening in case 72 above the level of the electrolyte, it reduces the chances of electrolyte leakage.

Whenever an opening is made through the case or cap of the cell, there is a chance of leakage of electrolyte or gases. Thus, an electrolyte level monitoring sensor, as shown FIG. 5, which does not require penetration into the cell is particularly useful. The sensor includes a circuit including an electrical wire 90 wrapped at least one turn about cell 10 adjacent a selected upper or lower level of the electrolyte within the cell. Wire 90 functions as the inductor coil of a tank circuit, which is an inductor and capacitor C connected in parallel. To monitor the level of electrolyte, interface circuitry 92 excites the circuit such that a sine wave is generated and observes evidence of energy loss in the circuit. This information is communicated to the controller for control of the system and to alert the user. When electrolyte such as KOH is present in the tank and reaches the level of the wire the losses in the wire are augmented by energy losses in the electrolyte. Increases in losses in the coil by the electrolyte are significant, for example 50% of the losses of the original coil (i.e. the wire itself). The frequency of the sine wave that should be used is based on absorption to the electrolyte and should not be in the broadcast band for radios or able to create interference with vehicle systems. Using concentrated KOH as the electrolyte, a frequency of about 2 MHz has shown to be particularly useful.

A number of circuits are useful for setting up an electrolyte level tank circuit sensor. In one embodiment, interface circuitry 92 excites wire 90 with a constant sine wave current. The energy loss by electrolyte results in a reduced sine wave voltage in the tank circuit as detected by the interface circuitry. In another embodiment, a sine wave or pulse is generated by the interface circuitry and used to excite wire 92. When the excitation is stopped, the interface circuitry monitors decay. The presence of electrolyte in the cell at the level of the wire shortens the decay time. In a preferred embodiment, interface circuitry 92 includes an oscillator. Using the oscillator, a sine wave is generated in the circuit itself by feedback. Using a class C oscillator, because of its high efficiency, the power supplied to the oscillator is a direct measurement of the total loss in the tank circuit. When electrolyte, such as KOH, is adjacent the wire, the loss increases accordingly.

One or more tank circuit electrolyte level sensors or one or more reed switches described above can be used in an automatic filler control loop. This innovation eliminates the need for the user to add water as regularly, and allows for a much larger amount to be added at less frequent intervals. It also demands much less care and protects the cells from overfilling. It is possible to use waste heat generated during electrolysis or from the vehicle engine itself in a heat exchanger adjacent a distilled water storage tank, to melt enough distilled water in cold weather to fill the cells.

When using a single sensor of either the reed switch or tank circuit type in a automatic fill control loop, to sense a low level condition, a valve will open or start at a selected signal from sensor 74 and keep the valve open until a selected amount of water has passed into the cell. An overshoot in the system will overfill the cell slightly, but by a controlled amount. This overshoot will allow the valve/pump to operate infrequently.

When using two sensors, the control loop will operate the valve/pump when the level reaches the lower reed switch or a wire of a first tank circuit. The filling operation continues until the electrolyte level reaches the upper reed switch or upper wire of a second tank circuit.

Figure 6:
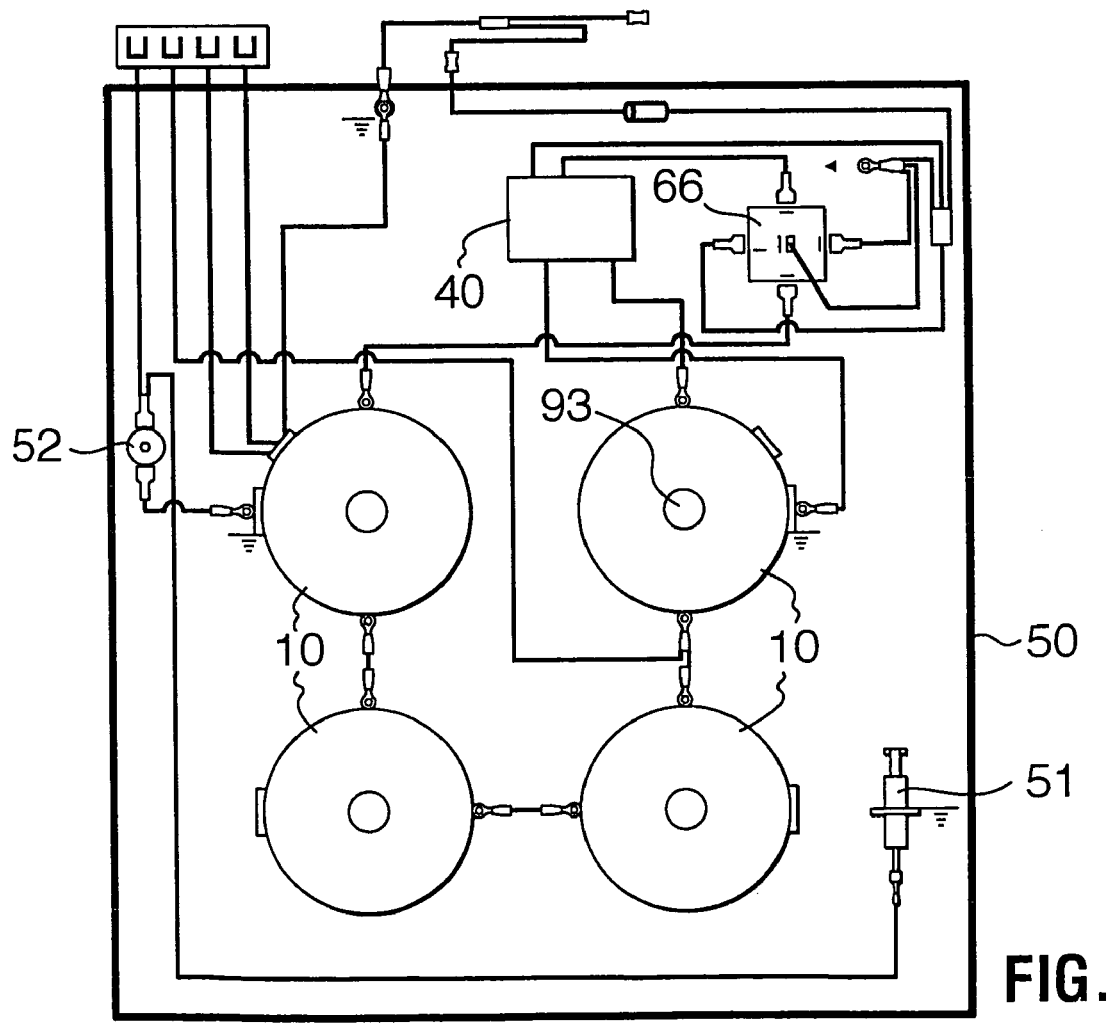
FIG. 6 is a schematic view of a gas generator box useful in the present invention.

It is preferred for ease of installation and increased safety that the hydrogen generating system of the present invention be provided as a modular apparatus, as illustrated in FIG. 6. In this preferred embodiment, the system includes a gas generator box 50, as noted previously, which contains the electrolysis cells 10, the power regulator 40, and sensor 52 to monitor operation of the electrolysis process. The controller is in dash module 42 (FIG. 1). A pump module, and a block of sensors mounted on the vehicle/chassis are provided as separate modules. Box 50 is provided with a closable and lockable door with safety switch 51.

Preferably, box 50 includes an electrolyte level indicator 93 for guidance during refilling the cells. In addition, an interface port (not shown) for establishing communication between the system controller and a diagnostic computer can be provided.

Figure 7:
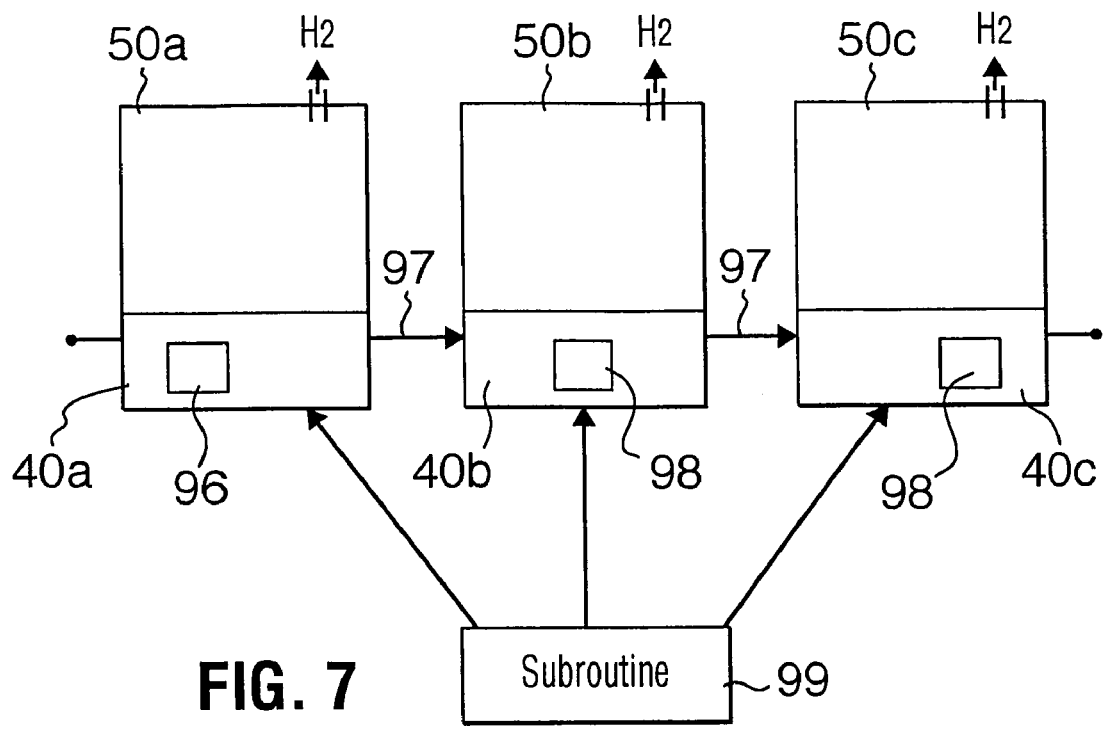
FIG. 7 is a diagram of a phase locking arrangement for a hydrogen generating system according to one aspect of the present invention.

By adopting a modular structure for the hydrogen generating system, installation of the system is simplified as the gas generator may be easily installed and connected to the other components. Box 50 can be quite rugged, formed of steel, thereby shielding the electrolysis cells from potential damage in the event that the vehicle is involved in an accident. The use of the gas generator box also allows for ease in varying the number of electrolysis cells to match the requirements specific to every individual application. The size and total number of cells installed in the gas generator box defines maximum capacity of hydrogen/oxygen rates. For smaller engines one box may be sufficient, while larger engines may demand a multitude of such boxes connected in series, allowing operation at lower current values.

Where a modular installation is used in a vehicle more than one box is used and each box contains electrolysis cells and a power regulator for those cells. In this arrangement, the AC component of the power regulators in the various boxes can create alias frequencies that become audible in radios. Referring to FIG. 7, to overcome this problem, the power regulators can be phase locked together in a master slave configuration. As an example, if three box units 50*a*, 50*b* and 50*c* are used, each will have a power regulator 40*a*, 40*b*, 40*c*. One of the units, for example 50*a*, can be selected as the master unit. Unit 50*a* has phase locking circuitry 96 in communication with its power regulator. Master phase locking circuitry 96 selects the total system frequency because there is no frequency input to it. The problem of alias frequencies is handled by master unit 50*a* inputting a chopping frequency, as indicated at 97, to phase locking circuitry 98 in communication with the power regulators of each of the other units 50*b*, 50*c*, termed the slave units. Using the phase locking circuitry 98, the AC components of the power regulators in the slave units 50*b*, 50*c* run at the same frequency as that of the master unit 50*a*. The phase locking circuitry can be injection-locking circuitry in each unit, a combination of phase lock loop chips in each slave unit and a compatible oscillator of any kind in the master unit or circuitry to supply the pulse width modulator in each of the slave units 50*b*, 50*c* with a chopping frequency from the master unit 50*a*.

Alternately, or as a back up to the master-slave phase locking arrangement of FIG. 7, the controller can include an interrupt driven subroutine 99 that prevents operation of the hydrogen generating system in any condition giving audio frequencies. If one or more of the cells in the above-noted situation according to FIG. 7 were generating an audio frequency, the controller would shut down one or all of the slave units 50*b*, 50*c*, leaving only the master unit 50*a* and any units in-phase with master unit 50*a* operating. This would eliminate the audio interference.

As discussed with respect to FIG. 1, the controller useful in the present hydrogen generating system can include discrete logic or be an intelligent system driven via software. While most of the monitoring routines and control routines described hereinbefore can be provided in discrete logic, it is particularly useful, cost effective and flexible to use an intelligent controller.

Many later model motor vehicles utilize on-board computers (ECU) to control various parameters of the operation of the engine of the motor vehicle particularly with respect to controlling exhaust gas pollution. For example, many vehicles are provided with emission control units to determine the makeup of the exhaust gases or the fuel/air mixture being introduced into the engine. A preferred intelligent controller for the hydrogen generating system is capable of interfacing with the on-board computer to control electrolysis in response to engine conditions.

A particularly useful intelligent controller is shown in FIG. 8 and includes a chip including processor 100, volatile RAM memory 102 and non-volatile, PROM memory 104. The controller also includes external RAM and ROM 106 (i.e. not directly on the processor chip) and a power module 108. To provide for interface to external components, input/output (I/O) ports 110 are provided on the processor chip and interfaces 112 communicate between a plurality of external ports 114 and I/O ports 110 of the chip.

Power module 108 receives raw DC current from the vehicle power source such as the battery and converts and conditions the power for driving the controller.

The interfaces provide communication between the sensors and the controller. The interfaces may include A/D converters to convert analog signals to digital signals, a multiplexer to expand the number of channels that can be monitored etc. External ports 114 provide for: serial digital inputs such as, for example, from the vehicle's on-board computer; parallel digital inputs from, for example, on/off devices such as relays or reed switches; and parallel analog inputs from for example battery voltage sensors, pressure sensors, temperature sensors and pump current sensors. Outputs from external ports 114 include: parallel digital outputs such as to relays and to the power regulator; and serial digital outputs such as to the dash module, engine computer and to ports for communication to diagnostic computers. Interface with the vehicle's on-board computer allows the controller to read the engine's operating parameters (rpm's, speed, mass air flow, throttle position, etc.) and read and, preferably, write into the engine's computer (injector's pulse width, valve timing, ignition timing, etc.).

The PROM stores the software subroutines for the controller. The controller reads all the information from sensors, on-board computer etc. and defines the output profile for the power regulator and pump, adjusting for optimal efficiency, communicating unsafe conditions or directing system shutdown. The intelligent controller can be programmed to monitor and control the various system devices, to communicate with the engine computer and to interface with the user. As will be appreciated, operation of the controller can be extremely flexible and variable. One example of useful logic for the controller is described in U.S. application Ser. No. 09/628,134, filed Jul. 28, 2000.

In the preferred embodiment, the present invention describes a hydrogen generating system that uses hydrogen and oxygen gases to enhance the properties of the fuel obtaining better combustion efficiency resulting in a cleaner burn and better fuel economy. The reliability of an engine outfitted with such system will increase considerably, resulting in a longer life span, delivering more power and exhausting fewer pollutants. The system is easy to install and complimentary to a gasoline or diesel fueled motor vehicle.

Prototype models of the hydrogen generating system of the present invention were installed on various vehicles including a GMC Suburban, Ford Bronco and Cummins diesel engine for testing purposes. In all cases there was a significant reduction in carbon monoxide emission levels, particularly at engine idle, where the levels decreased up to 95%. Decreases in the level of the carbon monoxide emissions were observed over the full operating range of the engine and carbon monoxide emissions at some of these levels were so low they were not able to be detected. Similarly, hydrocarbon emission levels were also reduced significantly with reductions as high as 90% being observed. The use of the hydrogen generating system of the present invention also resulted in increased performance of the engines with engine torque shown to increase by as much as 10% and increases of up to 10% in the horse power output of the engine were also observed. Increases in mileage of up to 17% were also observed.

Although various preferred embodiments of the present invention have been described herein in detail, it will be appreciated by those skilled in the art that variations may be made thereto without departing from the spirit of the invention or the scope of the appended claims.

The Embodiments of the invention in which an exclusive property or privilege are claimed are as follows:

1. A hydrogen generating system for use in an internal combustion engine of a vehicle for increasing the efficiency of the engine and decreasing emissions from the engine, the hydrogen generating system comprising:
  a plurality of electrolysis cells for generating hydrogen and oxygen gases by electrolysis of an aqueous solution, the electrolysis cells being electrically connected in series;
  a power source for providing electrical power to the electrolysis cells through an output circuit;
  an outlet flow means for introducing the generated gases into the intake manifold system of the internal combustion engine;
  a monitoring means for monitoring the operating conditions of the hydrogen generating system, the monitoring means including a sensor for monitoring the integrity of the output circuit from the power source; and
  a control means in communication with the monitoring means and adapted to control the operation of the hydrogen generating system in response to the monitoring means, the control means including means in communication with the sensor for controlling operation of the hydrogen generating system based on the integrity of the output circuit.

2. The hydrogen generating system of claim 1 wherein the plurality of electrolysis cells includes a penultimate and last cells in the series and the sensor monitors the voltage in the electrical connection between the penultimate and last cells.

3. The hydrogen generating system of claim 1 wherein the sensor monitors current in the output circuit.

* * * * *